(12) United States Patent
Pavel (10) Patent No.: US 6,970,414 B1
(45) Date of Patent: Nov. 29, 2005

(54) THREE-DIMENSIONAL OPTICAL MEMORY WITH FLUORESCENT PHOTOSENSITIVE MATERIAL

(76) Inventor: Eugen Pavel, Celea Mosilor No. 274, Apt. 34, Bucharest, Sector 2 (RO)

( * ) Notice: Subject to any disclaimer, the term of this patent is extended or adjusted under 35 U.S.C. 154(b) by 0 days.

(21) Appl. No.: 09/601,015

(22) PCT Filed: Nov. 25, 1998

(86) PCT No.: PCT/RO98/00021

§ 371 (c)(1),
(2), (4) Date: Jul. 24, 2000

(87) PCT Pub. No.: WO00/31733

PCT Pub. Date: Feb. 6, 2000

(51) Int. Cl.[7] ................................................ G11B 7/24
(52) U.S. Cl. .................. 369/275.1; 369/103; 369/100; 369/112.01
(58) Field of Search ............................... 369/100, 103, 369/112.01, 112.1, 112.15, 121, 44.11, 44.12, 369/44.37, 275.1

(56) References Cited

U.S. PATENT DOCUMENTS

| 5,253,198 A | * | 10/1993 | Birge et al. ................. 369/121 |
| 5,268,862 A | | 12/1993 | Rentzepis |
| 5,472,759 A | | 12/1995 | Chen et al. |
| 5,478,498 A | | 12/1995 | Kodama et al. |
| 6,608,774 B1 | * | 8/2003 | Rentzepis ................... 365/127 |

OTHER PUBLICATIONS

"Photostimulable Luminescence Glasses . . . " by Hirao et al. (JP Appl. Phys. vol. 37/1998, pp 2254-2262).

* cited by examiner

Primary Examiner—Muhammad Edun
(74) Attorney, Agent, or Firm—Herbert Dubno (57) ABSTRACT

This invention relates to a three-dimensional optical memory made from a fluorescent photosensitive material, and a method and device for the storage and retrieval of information on the three-dimensional optical memory. The fluorescent photosensitive material can be glass and vitro-ceramic, both of which exhibit both fluorescent and photosensitive properties. Both one-photon and two-photon processes can be used for writing and reading the digital information on to the three-dimensional optical memory, in conjunction with a confocal microscope. A high reading sensitivity is obtained by using fluorescence during the reading cycle.

71 Claims, 5 Drawing Sheets

THREE-DIMENSIONAL OPTICAL MEMORY WITH FLUORESCENT PHOTOSENSITIVE MATERIAL

CROSS REFERENCE TO RELATED APPLICATIONS

This application is a national stage of PCT/RO98/00021 filed 25 Nov. 1998.

FIELD OF THE INVENTION

The present invention relates to a high-quality, high-density, three-dimensional optical memory, and more particularly to a method and apparatus for the storage and retrieval of digital data on a three-dimensional optical memory.

BACKGROUND OF THE INVENTION

Optical data storage is a known form of data storage. Known optical storage media such as compact disks, CD-ROMs, and DVDs are two-dimensional media storing separate bits of information in separate small areas on one or more surfaces. Although these optical data storage media have the capacity to store large amounts of information, there is an ever-increasing need to increase capacity and improve access time because computer applications are continually growing in size. However, there are physical limits as to how small the areas for storing information can be, as such, these memories are reaching theoretical limits in storage capacity. In addition, access tire is deteriorating as storage capacity increases. It is also desired that such computer memories have low-cost, small size and low energy consumption.

A solution to the desire for increased storage capacity, fast data transfer, and improved access time is the use of the third dimension in optical storage memories. Known three-dimensional optical storage memories have data storage densities that exceed the storage capacity of any present conventional two-dimensional optical storage memories (such as CD-ROMs) by more than three to four orders of magnitude. The increase in storage capacity stems from the ability to store information in any volume of a three-dimensional memory.

For example, the maximum theoretical storage density for a two-dimensional optical disk is $1/\lambda^2 = 3.5 \times 10^8$ bits/cm$^2$, while the storage density for a three-dimensional memory is $1/\lambda^3 = 6.5 \times 10^{12}$ bits/cm$^3$, assuming that the same wavelength of light $\lambda = 532$ nm is used to access the information.

Another form of high capacity optical storage medium is a three-dimensional holographic memory. Three-dimensional holographic memories also have data storage densities that exceed the storage capacity of known two-dimensional optical storage media. Experiments have been conducted on three-dimensional data storage using holographic memories made of photo-refractive materials (see D. Psaltis and F. Mok, *Scientific American*, November 1995, p. 52).

Although known three-dimensional memories provide improvements (e.g., access speed and storage capacity) over known two-dimensional storage memories, even these memories eventually will reach a limit in storage capacity unless a storage and retrieval process is developed which can better utilize every available volume in a three-dimensional storage memory.

Accordingly, it would be desirable to provide a data storage and retrieval system that increases the storage capacity of three-dimensional optical memories.

It would further be desirable to provide a three-dimensional optical memory that has an increased storage capacity over known optical memories.

SUMMARY OF THE INTENTION

It is an object of this invention to provide a data storage and retrieval system that increases the storage capacity of three-dimensional optical memories.

It is another object of this invention to provide a three-dimensional optical memory that has an increased storage capacity over known optical memories.

In accordance with the present invention, there is provided a three-dimensional optical memory made from a fluorescent photosensitive material, as well as a method and apparatus for storing and retrieving data on such a three-dimensional optical memory. Writing and reading of information on the optical memory is carried out with a coherent light source in conjunction with a confocal microscope. The confocal microscope is used to select a specific very small volume in the three-dimensional fluorescent photosensitive optical memory. The selected volume of fluorescent photosensitive memory is written by being irradiated (e.g., by a laser) at a wavelength that causes a transition producing either a fluorescence extinction or a fluorescence enhancement in the optical memory material. The memory is read by exciting at least the volume to be read at the fluorescence excitation wavelength of the memory. The presence or absence of fluorescence, caused by either fluorescence extinction or enhancement, can be used to represent 0's and 1's.

The storage and retrieval system of the present invention also preferably uses a two-photon absorption process to localize volumes in a three-dimensional medium. Two-photon absorption allows for writing to individually selected volumes of the optical memory without affecting neighboring bit locations, which allows smaller volumes to be used for each bit location, thus increasing memory capacity.

A two-photon absorption process involves the excitation of a molecule to an electronic state of higher energy by the absorption of two photons. A first photon emitted by a first excitation beam at a first predetermined wavelength excites the molecule to a virtual state, while a second photon emitted by a second excitation beam at a second predetermined wavelength further excites the molecule to a real excited state. The wavelengths of the two excitation beams are such that although neither beam is absorbed individually, the combination of the two wavelengths is in resonance with a molecular transition of the memory material.

Examples of fluorescent photosensitive materials that can be used for the three-dimensional optical memory of this invention are fluorescent photosensitive glass and fluorescent photosensitive vitroceramic. Both of these materials have the ability to fluoresce but are also photosensitive, changing their ability to fluoresce in response to applied radiation.

BRIEF DESCRIPTION OF THE DRAWINGS

The above and other objects and advantages of the invention will become apparent upon consideration of the following detailed description, taken in conjunction with the accompanying drawings, in which like reference characters refer to like parts throughout, and in which.

DETAILED DESCRIPTION OF THE INVENTION

The present invention provides a three-dimensional optical memory using a fluorescent photosensitive material as the storage medium, and also a method and apparatus for the storage and retrieval of data on such three-dimensional optical memory. Preferably, the fluorescent photosensitive material is a fluorescent photosensitive glass or a fluorescent photosensitive vitroceramic. Preferred embodiments of fluorescent photosensitive glass that can be used in the present invention are described in copending U.S. patent application Ser. No. 09/123,131 filed Jul. 27, 1998 (U.S. Pat. No. 6,228,787), which is incorporated herein by reference in its entirety. Preferred embodiments of fluorescent photosensitive vitroceramic that can be used in the present invention are described in copending U.S. patent application Ser. No. 09/123,133 filed Jul. 27, 1998 (U.S. Pat. No. 6,132,643), which is incorporated herein by reference in its entirety.

In accordance with a preferred embodiment of the present invention, data is written and read using one or more lasers. Writing preferably is performed using a laser at a wavelength that causes a transition in the fluorescence property of the memory material. Reading preferably is performed using a laser at a wavelength that excites fluorescence in the memory material. In some cases, the writing and reading wavelengths may be the same, and only a higher beam intensity is needed for writing, in which case one laser can be used if a one-photon process is acceptable. However, normally the writing and reading wavelengths will be different, and in addition a two-photon process will be desirable to reduce the size of the volumes of the optical memory used to store individual bits, so at least two lasers will be used for writing and reading. Indeed, unless the same wavelength for reading can also be used as one of the wavelengths in two-photon writing—e.g., at a higher intensity, it may be necessary to use a third laser in a reading and writing system. Of course, in a reading system used by an end user, only one light source may be required to excite the memory to its fluorescence state, although a two-photon reading process, which could require two light sources, could also be used.

Preferably, the memory material is formed into a cylindrical form, as in known disk drives, which preferably is rotated by a conventional motor as is normally used in disk drives for such purposes. The laser or lasers are aimed using conventional radial or vertical scanning systems to allow, in conjunction with the rotating disk, selection of a preferred volume at coordinates $(r, \theta, z)$.

More specifically, information is preferably stored and recorded on the fluorescent photosensitive optical storage medium by irradiating a selected volume of the optical storage medium preferably with a coherent light beam of predetermined wavelength $\lambda_0$, and in one type of two-photon system the optical memory is also irradiated by a coherent light beam at a second predetermined wavelength $\lambda_0'$.

Irradiation of the volume at wavelength $\lambda_0$ or $\lambda_0$ and $\lambda_0'$ causes the selected volume of fluorescent material to undergo a transition in the fluorescence properties of the optical storage medium (at the electronic level for fluorescent photosensitive glass described above and at a structural level for the fluorescent photosensitive vitroceramic described above) which produces a fluorescence extinction in the case of the glass described above and a fluorescence enhancement in the case of the vitroceramic described above. This fluorescence transition is confined to the irradiated areas.

As a result, while reading the optical memory, individually selected volumes of the fluorescent photosensitive glass that have been irradiated during the writing process will fluoresce less than the remainder of the glass upon being excited by a reading light beam at a predetermined excitation wavelength. In the case of fluorescent photosensitive vitroceramic, the specific volume that has been irradiated during writing will fluoresce more than the remainder of the vitroceramic upon being excited by a reading light beam at a predetermined excitation wavelength. Preferably, the reading light beam should be tuned to the fluorescence excitation frequency of the fluorescent photosensitive material.

Reading the optical memory is performed by identifying the difference in fluorescence intensities between a recorded volume of the medium and a non-recorded volume in the medium. These differences in fluorescence intensities can represent a sequence of code characters (e.g., 0's and 1's). For example, in the case of fluorescent photosensitive glass, extinction of fluorescence can be considered a "1" while normal fluorescence can be considered a "0", or vice versa. In the case of fluorescent photosensitive vitroceramic, enhanced fluorescence can be considered a "1" while normal fluorescence can be considered a "0", or vice versa. Of course, whatever convention is selected should be used consistently.

The data storage and retrieval system of the invention preferably uses a confocal microscope to select specific volumes of the three-dimensional optical memory during writing and reading. A confocal microscope improves depth resolution and allows a user to obtain precise depth selection in a three-dimensional structure. A confocal microscope provides a high-precision volume selection tool that prevents spherical aberrations. The confocal microscope operates by imaging a point light source onto an object which is located in the focal plane of the confocal microscope. Fluorescent light is emitted from the object and is directed to a photomultiplier detector through a detector pinhole. The detector pinhole is a spatial filter, which permits analysis of the light emitted only from the focal plane containing the object. This enables the confocal microscope to obtain improved spatial resolution. A computer displays the point (light emitted from the focal point) as a pixel on a screen. In order to produce a complete image, the light point is moved over the entire object, and the computer displays all of these points. The arrangement of the detector pinhole, conjugated to the illumination pinhole, ensures that only information from the focal plane reaches the detector. A confocal microscope thus has a unique ability to create images of individual sections throughout a sample with very fine detail. A confocal microscope is especially valuable in fluorescence microscopy since it almost completely eliminates stray light coming from outside the focal plane in which an object is positioned. Thus, a confocal system is able to produce fluorescence images with optimum clarity and resolution of fine details.

An example of a confocal microscope that can be used is the LEICA TCS NT Confocal System manufactured by the Leica Microscopy and Scientific Instruments Group, of Heerbrugg, Switzerland. The LEICA TCS NT Confocal System was used to analyze a volume of under 1 $\mu m^3$ in a sample and achieved an x-y resolution of 0.18 $\mu m$ (FWHM) and a corresponding z-resolution of better than 0.35 $\mu m$ (FWHM) at $\lambda$=488 nm and a numerical aperture (N.A.)=1.32.

As stated above, writing in the three-dimensional optical memory according to the invention preferably is accomplished using a two-photon absorption process. Two-photon microscopy is a non-linear technique that provides improved three-dimensional resolution of a material with negligible out-of-focus photo-excitation. A two-photon process refers to the intersection of two beams at a target location to effect a change of energy level at this location. In a two-photon process, a molecule undergoes an excitation to an electronic state of higher energy by the absorption of two photons. The first photon, preferably emitted by a laser at a first predetermined wavelength, excites the molecule to a virtual state, while a second photon, preferably emitted by a laser at a second predetermined wavelength, further excites the molecule to a real excited state. The wavelengths of the two excitation beams are such that although neither beam is absorbed individually, the combination of the two wavelengths is in resonance with a molecular transition. Therefore, both beams should preferably overlap temporally and spatially for two-photon absorption to result. (See S. Hunter, F. Kiamilev, S. Esener, D. A. Parthenopoulos, P. M. Rentzepis, *Applied Optics* 29 (14) (1990), 2058.) The two laser beams preferably have wavelengths that will cause a transition in the fluorescence properties of the optical memory material. Upon being irradiated, the selected molecules undergo an energy level transition and data is stored on a bit-by-bit basis in these localized areas where the two photons are absorbed. In a two-photon process, irradiation of the molecules occurs only in the focused region—neighboring bit locations are substantially unaffected.

Two-photon absorption may also be accomplished using only one laser beam emitted from one laser, if the laser preferably rapidly emits extremely short high-energy pulses. A first photon emitted by the laser at a predetermined wavelength excites the molecule to a virtual excited state and before the molecule can decay from the virtual excited state, a second photon emitted by the laser at the same predetermined wavelength further excites the molecule to a real excited state. Upon absorption of the two photons, the optical memory will undergo a transition in its fluorescence properties. The pulse width, and the interval between pulses, of the laser should be shorter than the time in which the excited molecule undergoes excitation decay, thus allowing the second photon to further excite the molecule before it returns to its initial unexcited state. Of course, in this case, the two pulses will not overlap temporally, although they preferably overlap spatially.

In another preferred embodiment, writing in the three-dimensional optical memory is preferably accomplished with a one-photon absorption process. One-photon absorption irradiates an area using only one laser beam having a predetermined writing wavelength. The predetermined writing wavelength is a wavelength that can cause a transition in the fluorescence properties of the optical memory material. Performing a write operation using only one laser beam may result in the irradiation of molecules outside of the focused region—the irradiated area is not as localized as with two-photon absorption. Therefore, a volume used to store information with a one-photon process may have to be larger than a volume used to store information with a two-photon process, possibly reducing the storage capacity of the memory.

With both one-photon and two-photon absorption processes, the irradiated volume of fluorescent material undergoes a transition (at the electronic level for the fluorescent photosensitive glass and at a structural level for the fluorescent photosensitive vitroceramic) which produces a fluorescence extinction in the case of the fluorescent photosensitive glass described above and a fluorescence enhancement in the case of the fluorescent photosensitive vitroceramic described above. Exciting the fluorescent photosensitive glass to read information will result in individually selected volumes of the fluorescent photosensitive glass fluorescing less than the remainder of the glass that have not been irradiated during writing. In the glass, the non-irradiated areas have a stronger fluorescence than the irradiated areas. This reduced fluorescence in areas exposed to the photoionizing radiation during writing may be the result of photoionized photosensitive rare earths inhibiting the fluorescence in that area. Exciting the fluorescent photosensitive vitroceramic to read information will result in an increased fluorescence at the specific volumes that have been irradiated during writing, as compared to the remainder of the vitroceramic that has not been irradiated during writing.

Reading information from the three-dimensional optical memory operates similarly to writing information to the three-dimensional optical memory. However, reading is preferably performed at a wavelength that excites fluorescence in the material, whereas writing is preferably performed at a wavelength that causes a transition in the fluorescence properties of the material. If the wavelengths are the same for writing and reading, then the same light beam generator (e.g., a laser) can preferably be used for both writing and reading in a one-photon process—e.g., with a higher beam intensity used for writing. However, matching the writing and reading wavelengths is difficult, so an additional light beam generator or generators may be necessary for reading.

To read information from the optical memory, a light beam (e.g., a laser beam) tuned to the fluorescence excitation frequency of the optical memory material preferably irradiates the optical memory. In the case of an optical memory made from fluorescent photosensitive glass, the volumes not irradiated during the writing process will exhibit strong fluorescence, unlike the irradiated volumes that exhibit less or no fluorescence. In the case of an optical memory made from fluorescent photosensitive vitroceramic, the volumes irradiated during the writing process fluoresce more strongly than the remainder of the memory.

Data can preferably be retrieved from the three-dimensional optical memory by using a one-photon excitation process. With a one-photon excitation process, one reading light beam (e.g., a laser beam) having a predetermined reading wavelength illuminates the fluorescent photosensitive memory and causes a one-photon excitation at individually selected volumes of the optical memory. The reading light beam is preferably tuned to the fluorescence excitation frequency of the fluorescent photosensitive material.

Data can also preferably be retrieved from the three-dimensional optical memory by using a two-photon excitation process. With a two-photon process, predetermined reading wavelengths illuminate the fluorescent photosensitive memory and cause a two photon excitation at individually selected volumes. The two light beams when superposed achieve fluorescence excitation of the fluorescent photosensitive material.

To store and retrieve information from the optical memory, specific volumes are preferably selected using conventional vertical and radial scanning systems and a conventional motor for the rotation of the memory medium. The memory medium preferably is cylindrical. The combination of these scanning systems and motor provides accurate focusing of a light beam on any specific volume (r, θ, z) throughout the three-dimensional optical memory.

The fluorescent photosensitive material used in one preferred embodiment of the three-dimensional optical memory of the present invention is preferably fluorescent photosensitive glass as described in more detail in above-incorporated application Ser. No. 09/123,131. Fluorescent photosensitive glass exhibits both fluorescent and photosensitive properties.

Generally, glass is obtained by cooling a melt in such a way that crystallization is suppressed. Glass also can be produced by the known sol-gel method.

Most glasses are oxide glasses. The structure of oxide glasses consists of a continuous network of glass-forming oxides in which long range order is missing. Glass-forming oxides such as $SiO_2$, $P_2O_5$, $GeO_2$, $Al_2O_3$, $B_2O_3$ and $Ga_2O_3$ have the strongest bonding strength among glass-forming oxides. Such glass-forming oxides are known as glass network formers. Oxides with weak bonding strength, such as oxides of alkali, alkaline earth, and rare earths cannot form a glass network and are known as modifiers.

Some glasses are fluorescent. Fluorescent glasses, when exposed to ultraviolet light, convert that ultraviolet light into visible light. The fluorescence of rare earth metal ions in glass was first observed in the 1880s (see W. A. Weyl, "The Fluorescence of Glasses", in "Coloured Glasses", Society of Glass Technology, Sheffield, England, 1951). Fluorescent glasses are used in lasers, and the discovery of the lasing phenomenon gave a strong impetus to the development of rare earth activated fluorescent glasses. Various fluorescent glasses and their industrial applications are disclosed in U.S. Pat. Nos. 3,549,554, 3,846,142, 4,075,120, and 4,076,541.

Some glasses are photosensitive. When photosensitive glasses are irradiated with short wave radiation such as ultraviolet radiation or X-rays, the optical properties of the glass in the irradiated areas are modified. Photosensitive glasses generally contain photosensitive elements such as copper (Cu), silver (Ag) and gold (Au). The photosensitive elements in the glass, upon exposure to the incident radiation, absorb that radiation. Upon heat treatment of the glass (typically above the annealing point of the glass), metal particles are precipitated thus changing the color of the glass in the irradiated areas. Upon cooling of the glass, the colored areas remain colored unless subsequently reheated to a high temperature.

Photosensitivity was initially observed by Dalton and described in U.S. Pat. Nos. 2,326,012 and 2,422,472. Development of photosensitive glasses is described in U.S. Pat. No. 2,515,937.

In a preferred embodiment of this invention, the three-dimensional fluorescent photosensitive optical memories contain silicate or phosphate glasses which also include two or more rare earths. One or more of the rare earths imparts fluorescent properties to the glass while another of the rare earths included in the glass impart photosensitive properties to the glass.

Suitable base silicate glass compositions for use in this invention are both fluorescent and photosensitive, and comprise about 10 mole percent to about 80 mole percent $SiO_2$, up to about 54 mole percent $K_2O$, up to about 58 mole percent $Na_2O$, up to about 35 mole percent $Li_2O$, up to about 40 mole percent BaO, up to about 40 mole percent SrO, up to about 56 mole percent CaO, up to about 42 mole percent MgO and up to about 48 mole percent ZnO.

Suitable base phosphate glass compositions for use in this invention are both fluorescent and photosensitive, and comprise about 20 mole percent to about 80 mole percent $P_2O_5$, up to about 47 mole percent $K_2O$, up to about 60 mole percent $Na_2O$, up to about 60 mole percent $Li_2O$, up to about 58 mole percent BaO, up to about 56 mole percent SrO, up to about 56 mole percent CaO, up to about 60 mole percent MgO and up to about 64 mole percent ZnO. Additionally, yttrium (Y) may be included in amounts up to about 5 mole percent.

The fluorescent photosensitive glass used in the optical memory of the invention preferably is made by including two types of rare earths in a silicate or phosphate base glass. These two types of rare earths are (1) fluorescence-imparting rare earths (e.g., ytterbium (Yb), samarium (Sm), europium (Eu)) and (2) rare earth photosensitive agents (e.g., erbium (Er), thulium (Tm), praseodymium (Pr), ytterbium (Yb), holmium (Ho), samarium (Sm), cerium (Ce), dysprosium (Dy), terbium (Tb), neodymium (Nd)). These rare earths may be incorporated in oxide form into the glass in amounts up to about 5 mole percent of the rare earth oxide.

When a specific area of the fluorescent photosensitive glass is irradiated at a wavelength sufficient to photoionize the photosensitive rare earth in the glass, fluorescence in that specific area diminishes. Areas which have not been so irradiated continue to exhibit a strong fluorescence. Without being bound by theory, it is believed that fluorescence is diminished in areas exposed to the photoionizing radiation because the resulting photoionized photosensitive rare earths inhibit the fluorescence in that area.

In another more particularly preferred embodiment, the fluorescent photosensitive material used in the three-dimensional optical memory of the invention is fluorescent photosensitive vitroceramic, as described in more detail in above-incorporated application Ser. No. 09/123,133. Fluorescent photosensitive vitroceramic exhibits both fluorescent and photosensitive properties.

A vitroceramic is a glass matrix having fine crystals precipitated therein. Vitroceramic material is obtained by first melting a glass, such as a fluorosilicate glass, in any conventional manner. The resultant glass is then subjected to a heat treatment at a temperature above the glass transition temperature, thereby preferentially precipitating small crystals. Once the crystals are precipitated, the material has been transformed from glass to a vitroceramic.

Generally, when crystals are precipitated in a glass, the optical transmission is significantly reduced because the crystals cause light scattering. However, if the precipitated crystals are very small (e.g., smaller than the wavelength of incident light), and, if the difference in refractive index between the crystals and the glass matrix is also small, the loss of optical transmission due to light scattering is substantially minimized.

Crystal precipitation can be controlled with nucleation seeds which serve as catalysts for the crystal precipitation process. The efficiency of a given catalyst depends on a number of factors, including the similarity between the catalyst's own crystal structure and that of the crystal phase to be nucleated.

A vitroceramic exhibits different physical and chemical properties than the glass material from which it originates. Vitroceramics also are isotropic, flexible as to shape in which they can be formed, and their production cost is relatively low.

Some vitroceramics are fluorescent. Fluorescent materials convert incident light having a wavelength in one portion of the spectrum into light having a wavelength in a different portion of the spectrum. For example, when exposed to ultraviolet light, some fluorescent materials can convert that ultraviolet light into visible light. Some fluorescent materials can convert infrared light into visible light in a phenomenon known as up-conversion. In 1975, F. Auzel doped vitroceramics with rare earth metals. These vitroceramics converted infrared radiation into visible light (see F. Auzel, et al., *Journal of Electrochemical Society* 122 (1)(1975), 101).

Some vitroceramics are photosensitive. When photosensitive vitroceramics are irradiated with short wavelength radiation such as ultraviolet radiation or X-rays, the optical properties of the material in the irradiated areas are modified. Photosensitive vitroceramics generally contain photosensitive metals such as copper (Cu), silver (Ag) and gold (Au). The photosensitive metals, upon exposure to the incident radiation, absorb that radiation. Upon heat treatment, the photosensitive metal particles are precipitated in the irradiated areas and serve as nucleation seeds for subsequent crystal formation. The resultant crystals change the color of the vitroceramic in those irradiated areas.

Photosensitive vitroceramics have been obtained as described in U.S. Pat. No. 2,651,145. This process for producing a photosensitive vitroceramic requires that a sodium-silica base glass containing silver as a photosensitive element be exposed to ultraviolet light. The silver absorbs the incident radiation. Next, a heating process is employed to generate a photographic image by precipitating silver particles in the irradiated areas. These silver particles, in turn, provide nucleation sites for the growth of NaF crystals. The NaF crystals are large enough to scatter visible light, resulting in a white opaque image, which is opal-like in appearance.

In another embodiment of this invention, the three-dimensional fluorescent photosensitive optical memories contain fluorosilicate vitroceramics which include one or more photosensitizing metals and one or more rare earths.

In order to make a vitroceramic which is both fluorescent and photosensitive for use as an optical memory according to the present invention, it is first necessary to formulate a fluorosilicate base glass which also includes one or more photosensitizing metals and one or more rare earths.

Suitable fluorosilicate base glass compositions comprise about 10 mole percent to about 60 mole percent $SiO_2$, about 5 mole percent to about 60 mole percent $PbF_2$, about 0.05 mole percent to about 0.3 mole percent $Sb_2O_3$, up to about 0.05 mole percent $CeO_2$, up to about 60 mole percent $CdF_2$', up to about 30 mole percent $GeO_2$, up to about 10 mole percent $TiO_2$, up to about 10 mole percent $ZrO_2$, up to about 40 mole percent $Al_2O_3$, up to about 40 mole percent $Ga_2O_3$ and about 10 mole percent to about 30 mole percent $Ln1F_3$ where Ln1 is yttrium (Y) or ytterbium (Yb).

The fluorescent photosensitive vitroceramic is made by including in the fluorosilicate base glass one or more photosensitive metals such as silver (Ag), gold (Au) and copper (Cu) and one or more rare earths such as terbium (Tb), praseodymium (Pr), dysprosium (Dy), erbium (Er), holmium (Ho), europium (Eu) and thulium (Tm). These rare earths may be incorporated into the glass in the form of $Ln2F_3$ (where Ln2 is the rare earth) in amounts from about 0.1 mole percent to about 5 mole percent. The photosensitive metal is incorporated in amounts of about 0.01 mole percent to about 0.5 mole percent.

If after the fluorosilicate base glass containing one or more rare earths and one or more photosensitizing metals is prepared, the resulting glass is then exposed to ultraviolet light in specific areas, the photosensitizing metals in those areas absorb the radiation. If the glass is then subjected to heat treatment at a temperature higher than the glass transition temperature thereby causing the photosensitizing metals in the irradiated areas to precipitate and become available to serve as nucleation seeds for crystallization of fine fluoride crystals. The resulting fine fluoride crystals contain a large amount of rare earth ions.

If the entire resulting vitroceramic is then exposed to an excitation radiation in order to cause the rare earth ions to fluoresce (the requisite excitation radiation is dependent on the particular rare earth ions present in the material composition), the presence of fluoride crystals containing rare earth ions can increase the fluorescence intensity of the areas subject to the first irradiation step to levels at least about 100 times the fluorescence intensity of the areas that were not subject to the first irradiation step.

The method and apparatus for the storage and retrieval of data on a three-dimensional optical memory preferably containing fluorescent photosensitive material (e.g., glass or vitroceramic) according to the present invention will now be described with reference to the preferred embodiments of FIGS. 1–5. Because of the substantially irreversible changes that take place in the optical memory according to this invention, the optical memory system as illustrated is a WORM (write-once-read-many) system. However, it may be possible upon the development of a suitable memory material to provide a memory in accordance with the invention where the changes that take place are reversible, so that a rewritable memory can be provided.

Figure 1:
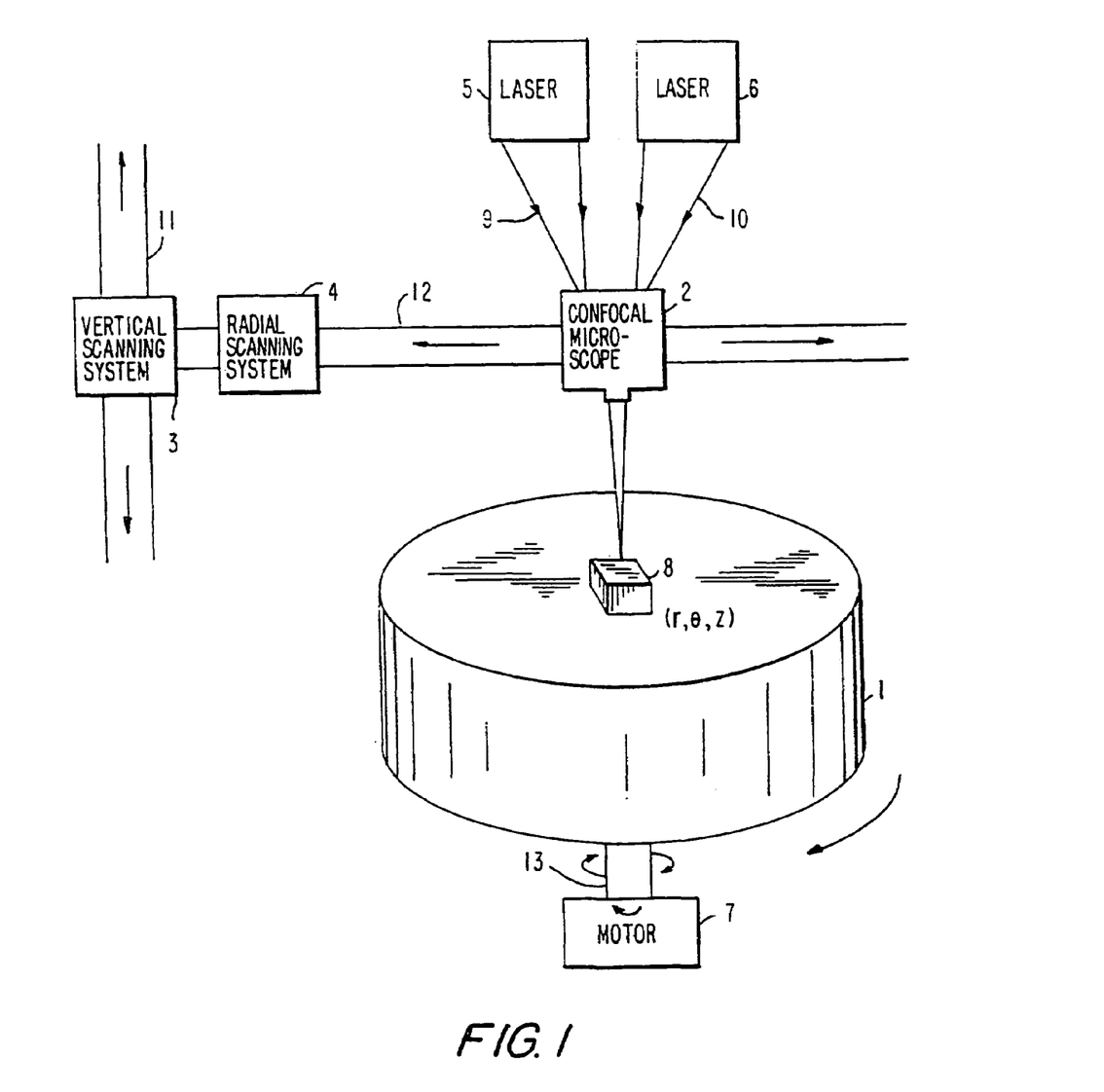
FIG. 1 is a diagrammatic representation of a first preferred embodiment of a writing configuration of the data storage and retrieval system according to the invention.

FIG. 1 illustrates a preferred embodiment for writing information to a fluorescent photosensitive optical memory 1 using a two-photon absorption process. In the two-photon absorption process, a coherent beam generator 5 (e.g., a laser) preferably emits a coherent light beam 9 (e.g., a laser beam) having a predetermined writing wavelength $\lambda_0$, and the coherent light beam is preferably directed towards a confocal microscope 2. Substantially concurrently in time, a coherent beam generator 6 (e.g., a laser) preferably emits a second coherent light beam 10 preferably having a predetermined writing wavelength $\lambda_0'$ which is directed towards confocal microscope 2. These wavelengths $\lambda_0$, $\lambda_0'$ are preferably those wavelengths that will cause a transition in the fluorescent properties of the fluorescent photosensitive material.

Confocal microscope 2, which is preferably coupled to coherent beam generators 5, 6, in conjunction with vertical scanning system 3, radial scanning system 4 and motor 7, preferably focuses the coherent light beams 9, 10 onto a selected volume 8 of fluorescent photosensitive optical memory 1. Vertical scanning system 3 and radial scanning system 4 preferably are conventional scanning systems such as are used in disk drives. Vertical scanning system 3 preferably moves confocal microscope 2 in the vertical direction along shaft 11, while radial scanning system 4 preferably moves confocal microscope 2 in the radial direction along arm 12. Also, motor 7 is preferably of the type normally used to rotate disk drives. These scanning systems allow confocal microscope 2 to position coherent light beams 9, 10 traveling through confocal microscope 2 onto any volume (r, θ, z) of optical memory 1 and record information at that location.

In this preferred two-photon writing embodiment, coherent light beams 9, 10, preferably emitted from coherent beam generators 5, 6, are focused by confocal microscope 2 so that coherent light beams 9, 10 converge to irradiate a selected volume 8 at the focal point of coherent light beams 9, 10. Selected volume 8 preferably absorbs one-photon from each coherent light beam, thus resulting in a two-photon absorption that causes a transition in the fluorescence properties of optical memory 1 at selected volume 8. Coherent light beams 9, 10 preferably have wavelengths $\lambda_0$, $\lambda_0'$ that cause a transition in the fluorescence properties of the optical memory material 1. Preferably, coherent light beams 9, 10 have wavelengths in the range of between about 300 nm and about 800 nm.

In another embodiment of this two-photon writing configuration, a single coherent beam generator 5 (e.g., a laser) preferably emits a coherent light beam 9 (e.g., a laser beam) preferably in short, rapid, high-energy pulses at a predetermined writing wavelength $\lambda_0$. Coherent light beam 9 is preferably directed towards confocal microscope 2 and is focused to irradiate a selected volume 8 at the focal point of coherent light beam 9. Wavelength $\lambda_0$ preferably will cause a transition in the fluorescent properties of the fluorescent photosensitive material. Selected volume 8 preferably absorbs two photons from coherent light beam 9, resulting in a transition in the fluorescence properties of the optical memory 1. In this two-photon embodiment, coherent beam generator 5 preferably emits laser beams having pulse widths below about 100 femtoseconds (fs) and a pulse repetition rate between about 75 MHZ and about 150 MHZ.

As depicted in the embodiment of FIG. 1, optical memory 1 preferably is a three dimensional optical memory preferably having a cylindrical shape preferably having a diameter of between 100 mm and about 150 mm, with a particularly preferred diameter of about 120 mm. A hole is preferably located along the longitudinal axis 13 of optical memory 1 and preferably has a diameter between about 10 mm and about 20 mm. The height or thickness of the optical memory 1 is preferably between about 1.2 mm and about 100 mm.

Figure 2:
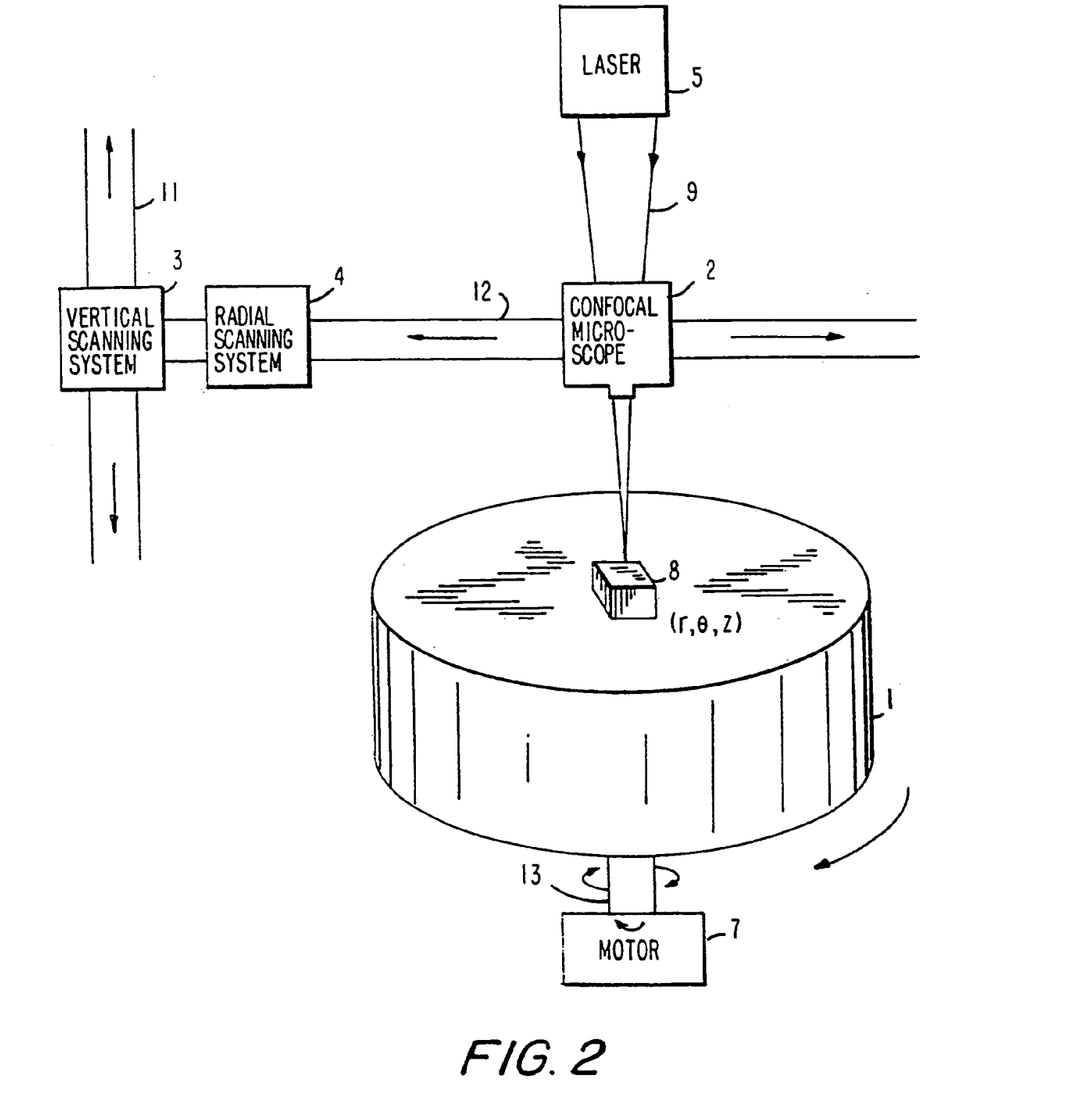
FIG. 2 is a diagrammatic representation of a second preferred embodiment of a writing configuration of the data storage and retrieval system according to the invention.

FIG. 2 illustrates another embodiment for writing information onto optical memory 1 using a one-photon absorption process. A one-photon absorption process preferably uses only one coherent light beam 9 to irradiate selected volume 8 of optical memory 1. In the one-photon absorption process, coherent beam generator 5 preferably emits a coherent light beam 9 preferably having a writing wavelength $\lambda_0$ and directs light beam 9 towards confocal microscope 2. This wavelength preferably will cause a transition in the fluorescent properties of the fluorescent photosensitive material. Preferably, this coherent light beam 9 has a wavelength in the range of between about 300 nm and about 800 nm.

Confocal microscope 2, in conjunction with vertical scanning system 3, radial scanning system 4, and motor 7, preferably focuses coherent light beam 9 generated by coherent beam generator 5 onto a selected volume 8 of the fluorescent photosensitive optical memory 1. Vertical scanning system 3 preferably positions confocal microscope 2 in the vertical direction along shaft 11, radial scanning system 4 preferably positions confocal microscope 2 in the radial direction along arm 12, and motor 7 rotates optical memory 1. The combined operation of these scanning systems 3, 4 and rotating motor 7 allows confocal microscope 2 to focus coherent light beam 9 and record information at any volume (r, θ, z) in optical memory 1, by causing a one-photon absorption at selected volume 8. This one-photon absorption causes a transition in the fluorescence properties at selected volume 8 of optical memory 1.

Figure 3:
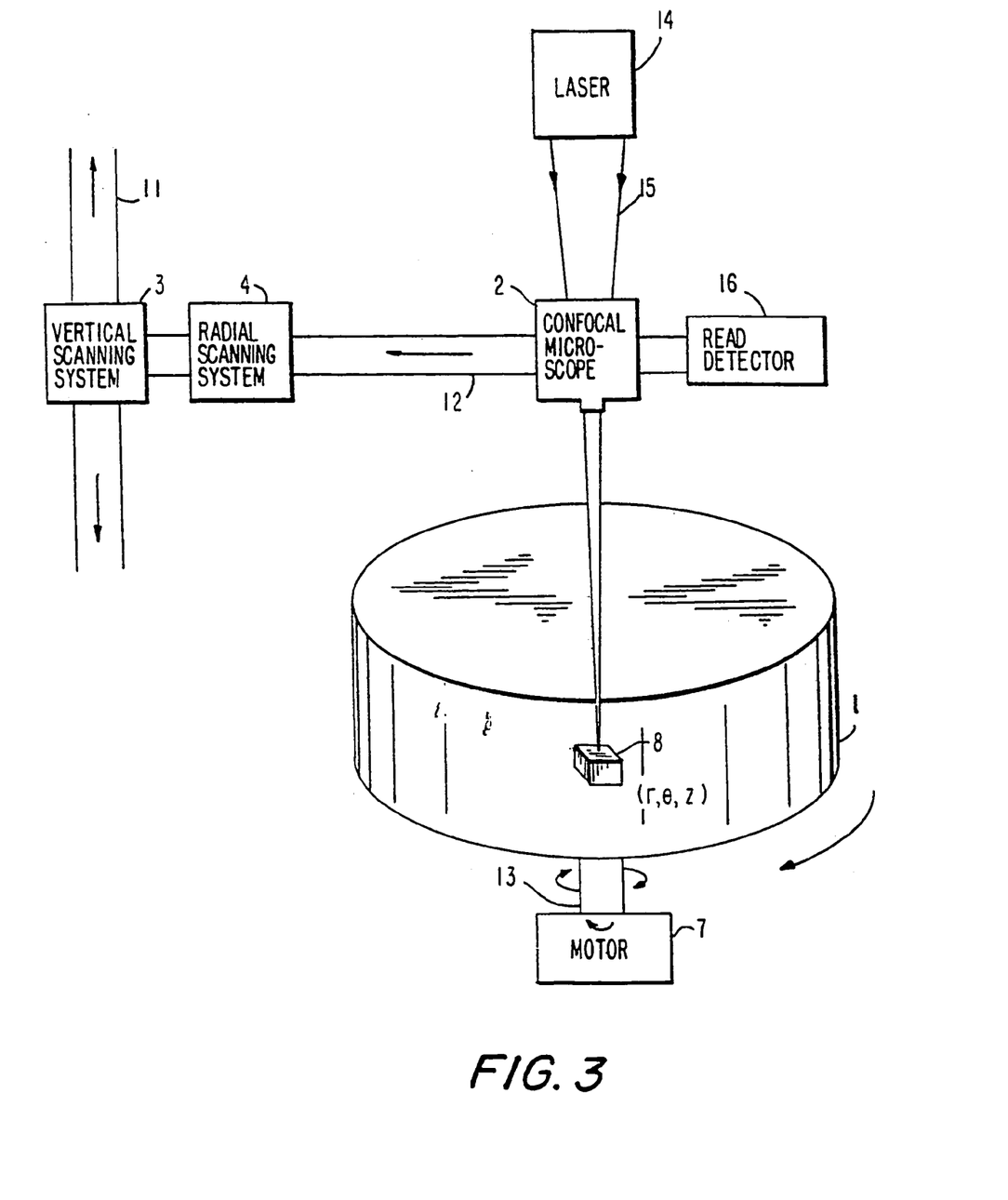
FIG. 3 is a diagrammatic representation of a first preferred embodiment of a reading configuration of the data storage and retrieval system according to the invention.

FIG. 3 illustrates a preferred embodiment for reading information from optical memory 1 using a one-photon excitation process. In the one-photon excitation process, reading light beam generator 14 preferably emits a reading light beam 15 having wavelength $\lambda_1$. In a more preferred embodiment, light beam generator 14 is a coherent light beam generator emitting coherent light beam 15. Wavelength $\lambda_1$ is preferably tuned to the fluorescence excitation frequency of the fluorescent photosensitive optical memory 1. Confocal microscope 2, in conjunction with vertical scanning system 3, radial scanning system 4, and motor 7, preferably focuses reading light beam 15 generated by reading light beam generator 14 onto a selected volume of optical memory 1. Vertical scanning system 3 preferably moves confocal microscope 2 in a vertical direction along shaft 11, radial scanning system 4 preferably moves confocal microscope 2 in a radial direction along arm 12, and motor 7 preferably rotates optical memory 1. Reading light beam 15 illuminates optical memory 1 and preferably produces a one-photon excitation at the volume selected for reading.

Read detector 16 detects the fluorescence emission from selected volume 8. The system is calibrated to recognize a particular intensity as an extinguished or enhanced intensity as compared to surrounding volumes of optical memory 1. As discussed previously, in the case of the fluorescent photosensitive glass, extinction of fluorescence can be considered a "1" while normal fluorescence can be considered a "0", or vice versa. In the case of fluorescent photosensitive vitroceramic, enhanced fluorescence can be considered a "1" while normal fluorescence can be considered a "0", or vice versa.

Read detector 16 can preferably be a charge-coupled device (CCD), a photodiode, a photomultiplier tube, or other device capable of detecting fluorescence emissions.

In another embodiment of this one-photon reading configuration, the fluorescent photosensitive material of optical memory 1 is such that the reading wavelength substantially matches the writing wavelength. More specifically, the wavelength which causes transitions in the fluorescence properties of the fluorescent photosensitive material is the same as the wavelength that causes a fluorescent excitation of the material. In such a case, only one light beam generator is preferably used in a one-photon process for both writing information to and reading information from optical memory 1. Normally in such an embodiment, the beam intensity used for writing would be higher than the beam intensity used for reading.

Figure 4:
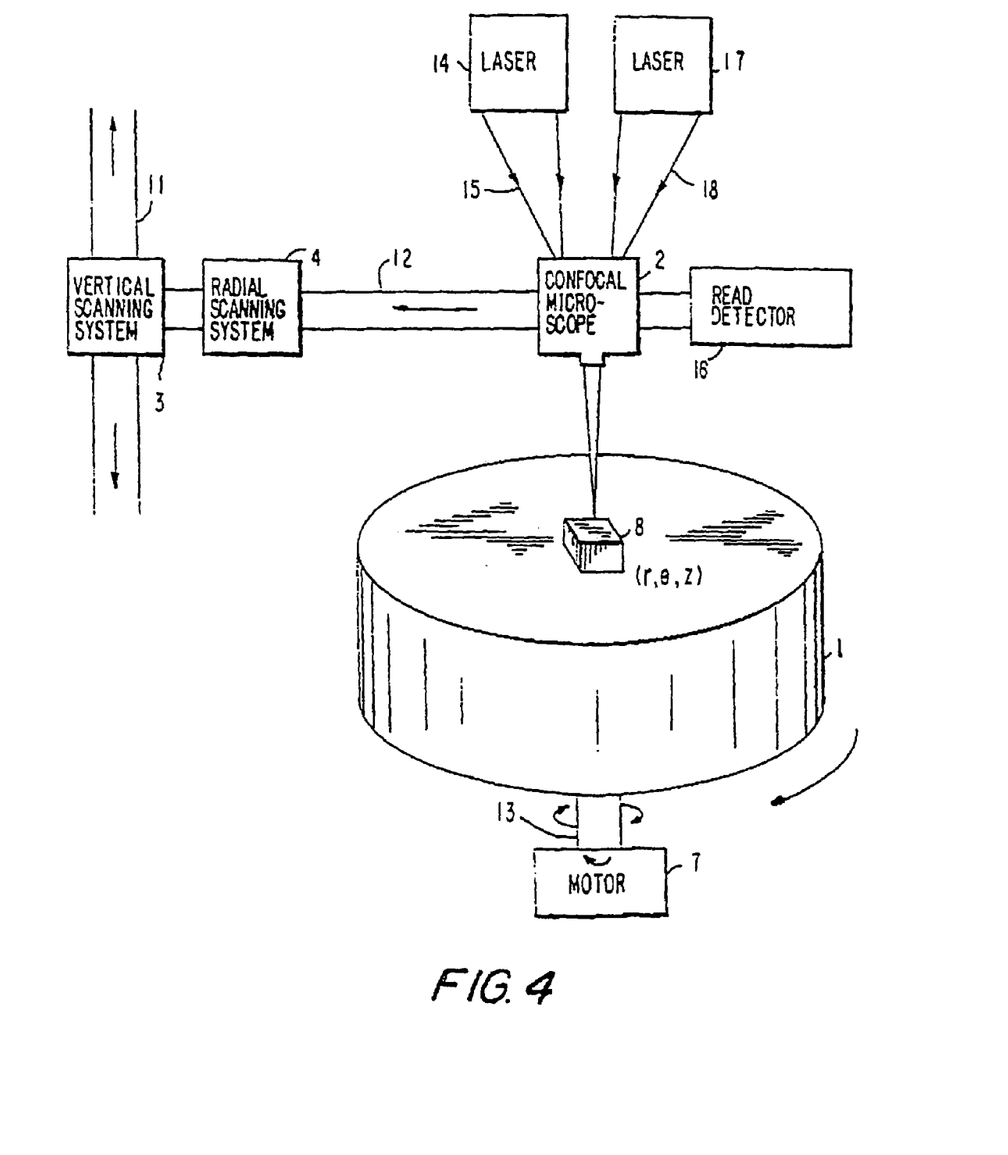
FIG. 4 is a diagrammatic representation of a second preferred embodiment of a reading configuration of the data storage and retrieval system according to the invention.

FIG. 4 illustrates a reading embodiment using a two-photon excitation process. In a two-photon excitation process, first reading light beam generator 14 preferably emits a first reading light beam 15 preferably having a predetermined reading wavelength $\lambda_1$. Second reading light beam generator 17 preferably emits a second reading light beam 18 having a preferred predetermined reading wavelength $\lambda_1'$. Reading light beam generators 14, 17 preferably are coherent light beam generators. The two reading light beams 15, 18 when superposed achieve fluorescence excitation of the optical memory 1. The two reading light beams 15, 18 are directed toward optical memory 1, where the two reading light beams 15, 18 converge and illuminate a selected volume to be read within optical memory 1. Confocal microscope 2, in conjunction with vertical scanning system 3, radial scanning system 4, and motor 7, preferably focuses reading light beams 15, 18 generated by reading light beam generators 14, 17 onto a selected volume 8 of optical memory 1. Vertical scanning system 3 moves confocal microscope 2 in a vertical direction along shaft 11, radial scanning system 4 moves confocal microscope in a radial direction along arm 12, and motor 7 rotates optical memory 1. This enables confocal microscope 2 to focus the two reading light beams 15, 18 onto any selected volume in optical memory 1 to read any information stored therein.

Read detector 16 monitors the fluorescence emission of the illuminated volume to determine if the volume is in a "1" state or a "0" state (enhanced fluorescence or fluorescence extinction) as discussed above in connection with FIG. 3.

In another embodiment of this two-photon reading configuration, reading light beam generator 14 (e.g., a laser) preferably emits a reading light beam 15 (e.g., a laser beam) preferably in short, rapid, high-energy pulses at a predetermined reading wavelength $\lambda_1$. Reading light beam 15 is preferably directed towards confocal microscope 2 and is focused to excite a selected volume 8 at the focal point of reading light beam 15. Selected volume 8 preferably absorbs two photons from reading light beam 15, resulting in a fluorescence excitation of optical memory 1. In this two-photon embodiment, reading light beam generator 14 preferably emits laser beams having pulse widths below about 100 femtoseconds (fs) and a pulse repetition rate between about 75 MHZ and about 150 MHZ.

Figure 5:
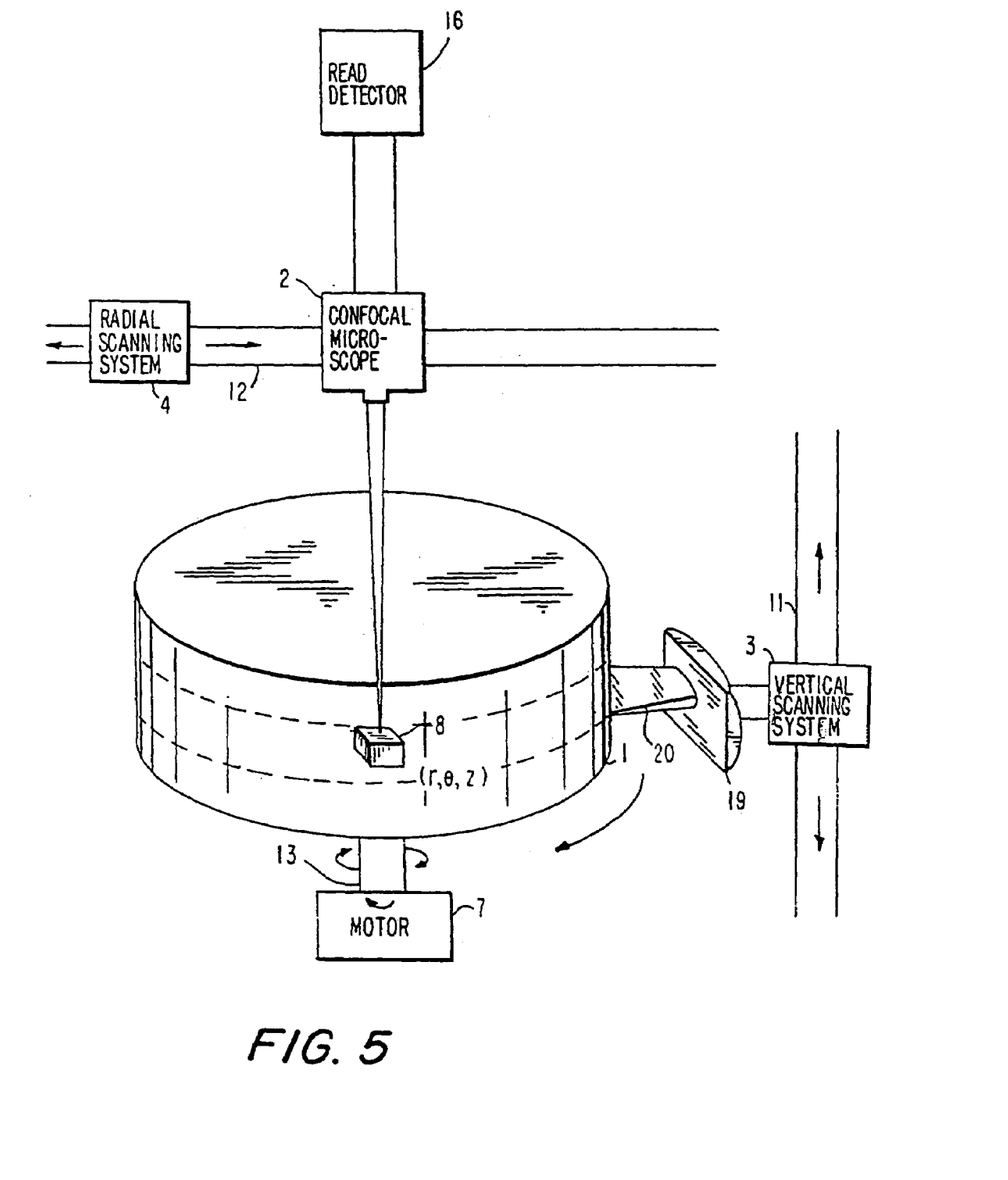
FIG. 5 is a diagrammatic representation of a third preferred embodiment of a reading configuration of the data storage and retrieval system according to the invention.

FIG. 5 illustrates another embodiment for reading information in accordance with the invention. Reading light source 19 preferably emits a light beam 20 having wavelength $\lambda_1$ to illuminate a volumetric slice of optical memory 1, as opposed to only specific individual volumes. Preferably, reading light source 19 can illuminate an entire plane or multiple planes within optical memory 1. Reading light source 19 can preferably be a laser, a semiconductor diode laser, a mercury vapor lamp or other device capable of generating a light beam at wavelength $\lambda_1$, which preferably is the fluorescence excitation wavelength of the fluorescent photosensitive optical memory 1.

The entire illuminated band will fluoresce, except that volumes that have been written to contain information and have undergone a transition during the write process will exhibit a fluorescence extinction in the case of the fluorescent photosensitive glass optical memory or a fluorescence enhancement in the case of the fluorescent photosensitive vitroceramic optical memory. Read detector 16 preferably detects the fluorescence emission from the selected volume to determine if the volumes within optical memory 1 are in a "1" state or a "0" state. In a preferred embodiment, read detector 16 detects fluorescence extinction or fluorescence enhancement occurring in the uppermost plane or uppermost layer in the illuminated band. Any fluorescence emissions from lower planes preferably will be overpowered by the emission from the uppermost plane, so that the height of the illuminated band is not important. Reading the uppermost plane or uppermost layer from above optical memory 1 preferably avoids noise which may result from reading through other volumes that may be excited, whether by reading from the side, or by reading from above but in a plane other than the uppermost plane. Vertical scanning system 3 moves reading light source 19 in the vertical direction along shaft 11 to allow reading light source 19 to illuminate any selected volumetric slice within optical memory 1. Radial scanning system 4 preferably moves confocal microscope 2 in the radial direction along arm 12 to allow read detector 16 to detect the fluorescence emission from selected volumes within optical memory 1. In combination with the rotation of optical memory 1 by motor 7, this allows read detector 16 to monitor the fluorescence emission of any illuminated volume in optical memory 1.

The coherent beam generators used in the invention can preferably be any type of laser capable of emitting short, high-energy pulses. Short high-energy pulses of light minimize damage to the three-dimensional optical memory material. A pulse laser used in this invention preferably has a pulse width in the range of between about 50 fs and about 150 fs.

In a preferred embodiment, the coherent beam generators are preferably Ti:sapphire lasers preferably having an oscillating wavelength in the range of between about 700 nm and about 800 nm, a pulse width preferably in the range of between about 50 fs and about 150 fs, a repetition rate preferably in the range of between about 75 MHZ and about 150 MHZ, and a peak power preferably in the range of between about 50 kW and about 200 kW.

In another embodiment, the coherent beam generators are preferably Xenon Chloride (XeCl) lasers preferably having a wavelength of about 308 nm, or Neodymium:Yttrium-Aluminum-Garnet (Nd:YAG) laser preferably having a wavelength of about 532 nm.

In another embodiment, a two-dimensional optical memory storage device is made from fluorescent photosensitive materials. The data storage and retrieval system of this invention will increase the capacity of such a memory by reducing the size of individual areas used to store individual bits.

The present invention was tested on a three-dimensional optical memory made from fluorescent photosensitive glass doped with cerium and europium. The fluorescent photosensitive glass had the following composition: $Na_2O$—$P_2O_5$-0.005 $CeO_2$-0.005 $Eu_2O_3$.

Information was written to the three-dimensional optical memory using a XeCl laser having a wavelength $\lambda_1$=308 nm to irradiate selected volumes of the optical memory. The irradiated volumes of the fluorescent photosensitive glass experienced a fluorescence extinction. Information was read from the optical memory using a one-photon excitation process, where a second laser, an Nd:YAG laser, having a wavelength of $\lambda_2$=532 nm, was used to illuminate the optical memory at the fluorescence excitation frequency of the fluorescent photosensitive glass. The volumes containing information exhibited a decreased fluorescence as opposed to the volumes that did not contain stored information.

Similarly, the present invention was tested on a three-dimensional optical memory containing fluorescent photosensitive glass, having the following composition: $2Na_2O$—$(Y_{0.94}Eu_{0.05}Pr_{0.01})_2O_3$-$5P_2O_5$. Information was written onto the three-dimensional optical memory using a two-photon absorption process. A tunable Ti:sapphire laser operating at wavelength $\lambda_1$= 720 nm with 100 fs laser impulses was used to irradiate selected volumes of the memory. These irradiated volumes experienced a fluorescence extinction. Information was read from the optical memory using an Nd:YAG laser operating at wavelength $\lambda_2$=532 nm to illuminate the optical memory. The volumes that have been written to exhibited a decreased fluorescence as compared to volumes that had not been written to.

The present invention was also tested on a three-dimensional optical memory made from fluorescent photosensitive vitroceramic doped with terbium. The optical memory had the following composition, in weight percent: ~$30SiO_2$-$45PbF_2$-$14Al_2O_3$-$10YF_3$-$1TbF_3$-$0.05Sb_2O_3$- 0.01 Ag. Information was written to and read from the optical memory using a tunable Ti:sapphire laser with 100 fs laser pulses to produce a two-photon absorption of the selected volumes. To write information to the optical memory, the Ti:sapphire laser was tuned to a wavelength $\lambda_1=720$ nm. The irradiated volumes of the fluorescent photosensitive vitroceramic experienced fluorescence enhancement. To read information, the laser was tuned to a wavelength $\lambda_2=750$ nm to illuminate the optical memory at its fluorescence excitation frequency. The volumes which had been written to exhibited an enhanced fluorescence as compared to volumes that had not been written to.

The present invention was also tested on an optical memory containing fluorescent photosensitive vitroceramic, having a composition, in weight percent: ~69$SiO_2$-15.3$Na_2O$-5ZnO-7$Al_2O_3$-0.25$Tb_4O_7$-0.25$CeO_2$-0.2$Sb_2O_3$-0.01 Ag-2.3F-0.7 Br. Writing and reading were performed using a two-photon process. Writing was performed with a tunable Ti:sapphire laser with 100 fs laser pulses at a wavelength $\lambda_1=720$ nm. The irradiated volumes experienced fluorescence enhancement. Reading was performed with a tunable Ti:sapphire laser having a wavelength $\lambda_2=980$ nm. The volumes which had been written to exhibited an enhanced fluorescence as compared to volumes that had not been written to.

Thus it is seen that a data storage and retrieval system that increases the storage capacity of three-dimensional optical memories, providing a three-dimensional optical memory with greatly increased storage capacity over known optical memories has been provided. One skilled in the art will appreciate that the present invention can be practiced by other than the described embodiments, which are presented for purposes of illustration and not of limitation, and the present invention is limited only by the claims which follow.

What is claimed is:

1. A three-dimensional optical memory comprising fluorescent photosensitive glass, wherein said glass comprises at least one of two or more rare earths selected from the group consisting of ytterbium (Yb), samarium (Sm), and combinations thereof; and at least one of two or more rare earths selected from a group consisting of erbium (Er), holmium (Ho), samarium (Sm), dysprosium (Dy), Terbium (Tb), neodymium (Nd) and combinations thereof.

2. A three-dimensional optical memory of fluorescent photosensitive glass according to claim 1 wherein said glass further comprises about 10 mole percent to about 80 mole percent $SiO_2$, up to about 54 mole percent $K_2O$, up to about 58 mole percent $Na_2$, up to about 35 mole percent $Li_2O$, up to about 40 mole percent BaO, up to about 40 mole percent SrO, up to about 56 mole percent CaO, up to about 42 mole percent MgO, up to about 48 mole percent ZnO and up to about 5 mole percent of said two or more rare earths in oxide form.

3. A three-dimensional optical memory of fluorescent photosensitive glass according to claim 1 wherein said glass further comprises about 20 mole percent to about 80 mole percent $P_2O_5$, up to about 47 mole percent $K_2O$, up to about 60 mole percent $Na_2O$, up to about 60 mole percent $Li_2O$, up to about 58 mole percent BaO, up to about 56 mole percent SrO, up to about 56 mole percent CaO, up to about 60 mole percent MgO, up to about 64 mole percent ZnO, up to about 5 mole percent yttrium (Y) ytterbium, and up to about 5 mole percent of said two or more rare earths in oxide form.

4. A three-dimensional optical memory comprising fluorescent photosensitive vitroceramic, wherein said vitroceramic comprises one or more photosensitizing metals and one or more rare earths, one or more photosensitizing metals is selected from the group consisting of gold (Au), copper (Cu) and combinations thereof; and one or more rare earths is selected from the group consisting praseodymium (Pr), dysprosium (Dy), erbium (Er), holmium (Ho), europium (Eu), thulium (Tm) and combinations thereof.

5. The three-dimensional optical memory of fluorescent photosensitive vitroceramic according to claim 4 wherein said vitroceramic further comprises, in mole percent, about 10% to about 60% SiO2, about 5% to about 60% $PbF_2$, about 0.05% to about 0.3% $Sb_2O_3$, up to about 0.5% $CeO_2$, up to about 60% $CdF_2$, up to about 30% $GeO_2$ up to about 10% $TiO_2$, up to about 10% $ZrO_2$, up to about 40% $Al_2O_3$, up to about 40% $Ga_2O_3$, and about 10% to about 30% $LnlF_3$ where Lnl is selected from the group consisting of yttrium (Y) and ytterbium (Yb).

6. The three-dimensional optical memory of fluorescent photosensitive vitroceramic according to claim 5 wherein said Lnl comprises ytterbium (Yb) and said Ln2 is selected from the group consisting of Er, Ho, Tm and combinations thereof; whereby said vitroceramic is capable of converting incident infrared radiation into visible light.

7. The three-dimensional optical memory of fluorescent photosensitive vitroceramic according to claim 6 wherein said Ln1 comprises yttrium (Y) and said Ln2 is selected from the group consisting of Pr, Dy, Ho, Er, Eu, Tm and combinations thereof; whereby said vitroceramic is capable of converting incident ultraviolet light into visible light.

8. A data storage and retrieval system for storing information on, and retrieving information from, a three-dimensional fluorescent photosensitive optical memory, said system comprising:
(a) a first coherent light beam generator in the form of a first Ti:sapphire laser for generating a first coherent light beam;
(b) a second coherent light beam generator in the form of a second Ti:sapphire laser for generating a second coherent light beam; and
c) an optical positioning system for directing said first coherent light beam and said second coherent light beam to irradiate an individually selected volume of said optical memory to produce a change in fluorescence characteristics in said selected volume.

9. A data storage and retrieval system for storing information on, and retrieving information from, a three-dimensional fluorescent photosensitive optical memory, said system comprising:
(a) a first coherent light beam generator for generating a first coherent light beam;
(b) a second coherent light beam generator for generating a second coherent light beam; and
c) an optical positioning system for directing said first coherent light beam and said second coherent light beam to irradiate an individually selected volume of said optical memory to produce a change in fluorescence characteristics in said selected volume; and
(d) an optical focusing system comprising a confocal microscope for focusing said first coherent light beam and said second coherent light beam on said optical memory.

10. A data storage and retrieval system for storing information on, and retrieving information from, a three-dimensional fluorescent photosensitive optical memory, said system comprising:
(a) a coherent light beam generator for generating a coherent light beam; and
(b) an optical positioning system for directing said coherent light beam to irradiate an individually selected volume of said optical memory to produce a change in fluorescence characteristics in said selected volume.

11. The data storage and retrieval system according to claim 10 wherein said coherent light beam generator irradiates said individually selected volume of said optical memory with said coherent light beam at a predetermined writing wavelength to cause a change in fluorescence characteristics in said selected volume.

12. The data storage and retrieval system according to claim 10 further comprising an optical focusing system for focusing said coherent light beam on said optical memory.

13. The data storage and retrieval system according to claim 12 wherein said optical focusing system comprises a confocal microscope.

14. The data storage and retrieval system according to claim 10 wherein said optical positioning system further comprises a vertical scanning system to position said coherent light beam along a vertical axis of said optical memory.

15. The data storage and retrieval system according to claim 10 wherein said optical positioning system further comprises a radial scanning system to position said coherent light beam along a radial axis of said optical memory.

16. The data storage and retrieval system according to claim 10 wherein said optical positioning system further comprises a motor to rotate said optical memory.

17. The data storage and retrieval system according to claim 10 wherein said coherent light beam generator is a laser.

18. The data storage and retrieval system according to claim 17 wherein said laser is a Ti:sapphire laser.

19. The data storage and retrieval system according to claim 17 wherein said laser is a pulse laser.

20. The data storage and retrieval system according to claim 10 further comprising a reading system for reading information from said optical memory, said reading system comprising:
 (a) a reading light beam generator for generating a reading light beam to excite at least an individually selected volume of said optical memory with said reading light beam at a predetermined reading wavelength; and
 (b) a detector for detecting fluorescence in at least said individually selected volume.

21. The data storage and retrieval system according to claim 20 wherein said reading light beam generator excites a volumetric slice of said optical memory with said reading light beam, said volumetric slice including multiple individual volumes.

22. The data storage and retrieval system according to claim 20 wherein said reading light beam generator is a coherent light beam generator.

23. The data storage and retrieval system according to claim 22 wherein said coherent light beam generator is a laser.

24. The data storage and retrieval system according to claim 22 wherein said laser is a Ti:sapphire laser.

25. The data storage and retrieval system according to claim 22 wherein said laser is a pulse laser.

26. The data storage and retrieval system according to claim 20 further comprising an optical focusing system for focusing said coherent reading light beam on at least individually selected volume of said optical memory.

27. The data storage and retrieval system according to claim 26 wherein said optical focusing system comprises a confocal microscope.

28. The data storage and retrieval system according to claim 20 further comprising a vertical scanning system to position said reading light beam along a vertical axis of said optical memory.

29. The data storage and retrieval system according to claim 20 further comprising a radial scanning system to position said reading light beam along a radial axis of said optical memory.

30. The data storage and retrieval system according to claim 20 further comprising a radial scanning system to position said detector along a radial axis of said optical memory.

31. The data storage and retrieval system according to claim 20 further comprising a motor to rotate said optical memory.

32. The data storage and retrieval system according to claim 10 wherein said fluorescent photosensitive optical memory comprises glass, said glass comprises two or more rare earths, at least one of said two or more rare earths is selected from the group consisting of europium (Eu), ytterbium (Yb), samarium (Sm), and combinations thereof; and at least one of said two or more rare earths is selected from a group consisting of erbium (Er), thulium (Tm), ytterbium (Yb), holmium (Ho), samarium (Sm), dysprosium (Dy), terbium (Tb), neodymium (Nd) and combinations thereof.

33. The data storage and retrieval system according to claim 32 wherein said glass further comprises about 10 mole percent to about 80 mole percent $SiO_2$, up to about 54 mole percent K2O, up to about 58 mole percent $Na_2O$, up to about 35 mole percent Li2O, up to about 40 mole percent BaO, up to about 40 mole percent SrO, up to about 56 mole percent CaO, up to about 42 mole percent MgO, up to about 48 mole percent ZnO and up to about 5 mole percent of said two or more rare earths in oxide form.

34. The data storage and retrieval system according to claim 32 wherein said glass further comprises about 20 mole percent to about 80 mole percent $P_2O_3$, up to about 47 mole percent $K_2O$, up to about 60 mole percent $Na_2O$, up to about 60 mole percent $Li_2O$, up to about 58 mole percent BaO, up to about 56 mole percent SrO, up to about 56 mole percent CaO, up to about 60 mole percent MgO, up to about 64 mole percent ZnO, up to about 5 mole percent yttrium (Y), and up to about 5 mole percent of said two or more rare earths in oxide form.

35. The data storage and retrieval system according to claim 10 wherein said fluorescent photosensitive memory comprises vitroceramic, said vitroceramic comprises one or more photosensitizing metals selected from the group consisting of silver (Ag), gold (Au), copper (Cu) and combinations thereof; and one or more rare earths selected from the group consisting of praseodymium (Pr), dysprosium (Dy), erbium (Er), holmium (Ho), europium (Eu), thulium (Tm) and combinations thereof.

36. The data storage and retrieval system according to claim 35, wherein said vitroceramic further comprises, in mole percent, about 10% to about 60% SiO2, about 5% to about 60% $PbF_2$, about 0.05% to about 0.3% $Sb_2O_3$, up to about 0.5% $CeO_2$, up to about 60% $CdF_2$, up to about 30% $GeO_2$ up to about 10% $TiO_2$, up to about 10% $ZrO_2$, up to about 40% $Al_2O_3$, up to about 40% $Ga_2O_3$, and about 10% to about 30% $LnlF_3$ where Lnl is selected from the group consisting of yttrium (Y) and ytterbium (Yb).

37. The data storage and retrieval system according to claim 36, wherein said Lnl comprises ytterbium (Yb) and said Ln2 is selected from the group consisting of Er, Ho, Tm and combinations thereof; whereby said vitroceramic is capable of converting incident infrared radiation into visible light.

38. The data storage and retrieval system according to claim 37, wherein said Ln1 comprises yttrium (Y) and said Ln2 is selected from the group consisting of Pr, Dy, Ho, Er, Eu, Tm and combinations thereof; whereby said vitroceramic is capable of converting incident ultraviolet light into visible light.

39. A data retrieval system for reading information from a three-dimensional fluorescent photosensitive optical memory, said retrieval system comprising:
(a) a reading light beam generator for generating a reading light beam to excite at least an individually selected volume of said optical memory with said reading light beam at a predetermined reading wavelength; and
(b) a detector for detecting fluorescence in at least said individually selected volume.

40. The data retrieval system according to claim 39 wherein said reading light beam generator is a coherent light beam generator.

41. The data retrieval system according to claim 40 wherein said coherent light beam generator is a laser.

42. The data retrieval system according to claim 41 wherein said laser is a Ti:sapphire laser.

43. The data retrieval system according to claim 42 further comprising an optical focusing system for focusing said reading light beam on said individually selected volume of said optical memory.

44. The data retrieval system according to claim 43 wherein said optical focusing system comprises a confocal microscope.

45. The data retrieval system according to claim 41 wherein said laser is a pulse laser.

46. The data retrieval system according to claim 39 further comprising a vertical scanning system to position said reading light beam along a vertical axis of said optical memory.

47. The data retrieval system according to claim 39, further comprising a radial scanning system to position said reading light beam along a radial axis of said optical memory.

48. The data retrieval system according to claim 39 wherein said fluorescent photosensitive memory comprises glass, said glass comprises two or more rare earths, at least one of said two or more rare earths is selected from the group consisting of europium (Eu), ytterbium (Yb), samarium (Sm), and combinations thereof; and at least one of said two or more rare earths is selected from a group consisting of erbium (Er), thulium (Tm), ytterbium (Yb), holmium (Ho), samarium (Sm), dysprosium (Dy), terbium (Th), neodymium (Nd) and combinations thereof.

49. The data retrieval system according to claim 48 wherein said glass further comprises about 10 mole percent to about 80 mole percent $Si_o2$, up to about 54 mole percent $K_2O$, up to about 58 mole percent $Na_2O$, up to about 35 mole percent $Li_2O$, up to about 40 mole percent BaO, up to about 40 mole percent SrO, up to about 56 mole percent CaO, up to about 42 mole percent MgO, up to about 48 mole percent ZnO and up to about 5 mole percent of said two or more rare earths in oxide fin.

50. The data retrieval system according to claim 48, wherein said glass further comprises about 20 mole percent to about 80 mole percent 45 up to about 47 mole percent $K_2O$, up to about 60 mole percent $Na_2O$, up to about 60 mole percent $Li_2O$, up to about 58 mole percent BaO, up to about 56 mole percent SrO, up to about 56 mole percent CaO, up to about 60 mole percent MgO, up to about 64 mole percent ZnO, up to about 5 mole percent yttrium (Y), and up to about 5 mole percent of said two or more rare earths in oxide form.

51. The data retrieval system according to claim 39, wherein said fluorescent photosensitive memory comprises vitroceramic, said vitroceramic comprises one or more photosensitizing metals selected from the group consisting of silver (Ag), gold (Au), copper (Cu) and combinations thereof; and one or more rare earths selected from the group consisting of praseodymium (Pr), dysprosium (Dy), erbium (Er), holmium (Ho), europium (Eu), thulium (Tm) and combinations thereof.

52. The data retrieval system according to claim 51, wherein said vitroceramic further comprises, in mole percent, about 10% to about 60% $SiO_2$, about 5% to about 60% $PbF_2$, about 0.05% to about 0.3% $Sb_2O_3$, up to about 0.5% $CeO_2$, up to about 60% $CdF_2$, up to about 30% $GeO_2$, up to about 10% $TiO_2$, up to about 10% ZrO2, up to about 40% $Al_2O_3$, up to about 40% $Ga_2O_3$, and about 10% to about 30% $Ln1F_3$ where Ln1 is selected from the group consisting of yttrium (Y) and ytterbium (Yb).

53. The data retrieval system according to claim 52, wherein said Ln1 comprises ytterbium (Yb) and said Ln2 is selected from the group consisting of Er, Ho, Tm and combinations thereof, whereby said vitroceramic is capable of converting incident infrared radiation into visible light.

54. The data retrieval system according to claim 52, wherein said Ln1 comprises yttrium (Y) and said Ln2 is selected from the group consisting of Pr, Dy, Ho, Er, Eu, Tm and combinations thereof; whereby said vitroceramic is capable of converting incident ultraviolet light into visible light.

55. A method for retrieving data from a fluorescent photosensitive three-dimensional optical memory, said method comprising:
(a) generating a reading light beam;
(b) exciting at least an individually selected volume of said optical memory with said reading light beam at a predetermined reading wavelength; and
c) detecting fluorescence in at least said individually selected volume.

56. The method for retrieving data according to claim 55 further comprising generating said reading light beam from a coherent light beam generator.

57. The method for retrieving data according to claim 55 comprising generating said reading light beam from a laser.

58. The method for retrieving data according to claim 57 comprising generating said reading light beam from a Ti:sapphire laser.

59. The method for retrieving data according to claim 57 comprising generating said reading light beam from a pulse laser.

60. The method for retrieving data according to claim 55 comprising detecting fluorescence in at least said individually selected volume using a detector.

61. The method for retrieving data according to claim 55 further comprising focusing said reading light beam on said optical memory.

62. The method for retrieving data according to claim 61 wherein said focusing further comprises using a confocal microscope.

63. The method for retrieving data according to claim 55 further comprising position said reading light beam along a vertical axis of said optical memory using a vertical scanning system.

64. The method for retrieving data according to claim 55 further comprising positioning said reading light beam along a radial axis of said optical memory using a radial scanning system.

65. The method for retrieving data according to claim 55, comprising providing a fluorescent photosensitive memory comprising glass, said glass comprising using two or more rare earths, selecting at least one of said two or more rare earths from the group consisting of europium (Eu), ytterbium (Yb), samarium (Sm), and combinations thereof, and selecting at least one of said two or more rare earths from a group consisting of erbium (Er), thulium (Tm) ytterbium (Yb), holmium (Ho), samarium (Sm), dysprosium (Dy), terbium (Th), neodymium (Nd) and combinations thereof.

66. The method for retrieving data according to claim 65, comprising using glass further comprising about 10 mole percent to about 80 mole percent SiO2, up to about 54 mole percent K2O, up to about 58 mole percent Na2O, up to about 35 mole percent Li2O, up to about 40 mole percent BaO, up to about 40 mole percent SrO, up to about 56 mole percent CaO, up to about 42 mole percent MgO, up to about 48 mole percent ZnO and up to about 5 mole percent of said two or more rare earths in oxide form.

67. The method for retrieving data according to claim 65 comprising using glass further comprising about 20 mole percent to about 80 mole percent $P_2O_3$ up to about 47 mole percent $K_2O$, up to about 60 mole percent $Na_2O$, up to about 60 mole percent $Li_2O$, up to about 58 mole percent BaO, up to about 56 mole percent SrO, up to about 56 mole percent CaO, up to about 60 mole percent MgO, up to about 64 mole percent ZnO, up to about 5 mole percent yttrium (Y), and up to about 5 mole percent of said two or more rare earths in oxide form.

68. The method for retrieving data according to claim 65, comprising using vitroceramic wherein said Lnl comprises yttrium (Y) and said Ln2 is selected from the group consisting of Pr, Dy, Ho, Er, Eu, Tm and combinations thereof; whereby said vitroceramic is capable of converting incident ultraviolet light into visible light.

69. The method for retrieving data according to claim 55, providing a fluorescent photosensitive memory comprising vitroceramic, said vitroceramic comprising using one or more photosensitizing metals and one or more rare earths, selecting one or more said photosensitizing metals from the group consisting of silver (Ag), gold (Au), copper (Cu) and combinations thereof; and selecting one or more said rare earths from the group consisting of praseodymium (Pr), dysprosium (Dy), erbium (Er), holmium (Ho), europium (Eu), thulium (Tm) and combinations thereof.

70. The method for retrieving data according to claim 69, comprising using said vitroceramic further comprising, in mole percent, about 10% to about 60% $SiO_2$, about 5% to about 60% $PbF_2$, about 0.05% to about 0.3% $Sb_2O_3$, up to about 0.5% $CeO_2$, up to about 60% $CdF_2$, up to about 30% $GeO_2$ up to about 10% $TiO_2$, up to about 10% $ZrO_2$, up to about 40% $Al_2O_3$, up to about 40% $Ga_2O_3$, and about 10% to about 30% $LnIF_3$ where Lnl is selected from the group consisting of yttrium (Y) and ytterbium (Yb).

71. The method for retrieving data according to claim 70, comprising using vitroceramic wherein said Lnl comprises ytterbium (Yb) and said Ln2 is selected from the group consisting of Er, Ho, Tm and combinations thereof, whereby said vitroceramic is capable of converting incident infrared radiation into visible light.

\* \* \* \* \*